(12) United States Patent
Reed et al.

(10) Patent No.: US 8,627,271 B2
(45) Date of Patent: Jan. 7, 2014

(54) REUSABLE BUSINESS SUB-PROCESSES AND RUN-TIME ASSEMBLY

(75) Inventors: Lynn Leah Reed, Newburyport, MA (US); Muhammad Zeeshan Butt, Foster City, CA (US); Shrikant Nene, Fairfield, CT (US); Alok Singh, Fremont, CA (US); Krishna Raju Venkata Addala, Westford, MA (US)

(73) Assignee: Oracle International Corporation, Redwood Shores, CA (US)

( * ) Notice: Subject to any disclaimer, the term of this patent is extended or adjusted under 35 U.S.C. 154(b) by 761 days.

(21) Appl. No.: 12/617,696

(22) Filed: Nov. 12, 2009

(65) Prior Publication Data

US 2010/0122232 A1 May 13, 2010

Related U.S. Application Data

(60) Provisional application No. 61/114,273, filed on Nov. 13, 2008.

(51) Int. Cl.
*G06F 9/44* (2006.01)
*G06F 21/00* (2013.01)
*G06Q 20/00* (2012.01)

(52) U.S. Cl.
USPC ........... 717/102; 717/101; 717/103; 717/104; 717/105; 717/106; 717/107; 717/108; 717/109; 705/50; 705/51; 705/52; 705/53; 705/54; 705/55; 705/56; 705/57; 705/58; 705/59; 705/60; 705/61; 705/62; 705/63; 705/64; 705/65; 705/66; 705/67; 705/68; 705/69; 705/70; 705/71; 705/72; 705/73; 705/74; 705/75; 705/76; 705/77; 705/78; 705/79; 705/80

(58) Field of Classification Search
None
See application file for complete search history.

(56) References Cited

U.S. PATENT DOCUMENTS

| | | | |
|---|---|---|---|
| 7,506,072 B2 * | 3/2009 | Waldorf et al. | 709/249 |
| 7,703,071 B2 * | 4/2010 | Kuester et al. | 717/104 |
| 8,209,672 B2 * | 6/2012 | Ivanov | 717/136 |
| 8,296,725 B2 * | 10/2012 | Allam et al. | 717/104 |
| 8,495,559 B2 * | 7/2013 | Akkiraju et al. | 717/104 |
| 2003/0144860 A1 * | 7/2003 | Casati et al. | 705/1 |
| 2004/0024688 A1 * | 2/2004 | Bi et al. | 705/37 |
| 2004/0139176 A1 * | 7/2004 | Farrell et al. | 709/220 |
| 2006/0074915 A1 * | 4/2006 | Bhandarkar et al. | 707/9 |
| 2006/0143229 A1 * | 6/2006 | Bou-Ghannam et al. | 707/104.1 |
| 2007/0016573 A1 * | 1/2007 | Nanavati et al. | 707/5 |
| 2007/0094638 A1 * | 4/2007 | DeAngelis et al. | 717/107 |

(Continued)

OTHER PUBLICATIONS

WS-BPEL Extension for Sub-processes—BPEL-SPE; A Joint White Paper by IBM and SAP; Sep. 2005; 17 pages.*

(Continued)

*Primary Examiner* — Henry Tsai
*Assistant Examiner* — Jing-Yih Shyu
(74) *Attorney, Agent, or Firm* — Trellis IP Law Group, PC

(57) ABSTRACT

Particular embodiments provide a method for orchestrating an order fulfillment business process that includes a sub-process. In one embodiment, abstraction of business processes from an underlying information technology (IT) infrastructure is provided. An orchestration process can be designed using sub-processes such that the sub-process is assembled at run-time into an executable process. The sub-process may be defined in an interface as a single step. A plurality of services as then assembled as steps in the executable process at run-time.

16 Claims, 6 Drawing Sheets

(56) References Cited

U.S. PATENT DOCUMENTS

2007/0282864 A1* 12/2007 Parees et al. .................. 707/100
2009/0106278 A1* 4/2009 Ramacher et al. ............ 707/100
2009/0150860 A1* 6/2009 Gschwind et al. ............ 717/104
2010/0211926 A1* 8/2010 Dan et al. ....................... 717/104

OTHER PUBLICATIONS

"On Demand Web Services-Based Business Process Composition"—Liang-Jie Zhang, Bing Li, Tian Chao & Henry Chang—Systems, Man and Cybernetics, 2003 IEEE International Conference date: Oct. 5-8, 2003 vol. 4, pp. 4057-4064.*

"Executing Abstract Web Process Flows"—Akkiraju et al.—Proc. 14th International Conference on Automated Planning and Scheduling, 2004—CITESEER (pp. 1-7).*

"On Accommodating inter service Dependencies in web process flow composition"—Verma et al.—2004 AAAI Spring Symposium Series, 2004—aaai.org (p. 1-7).*

Liangzhao Zeng, Hui Lei, Michael Dikun, Henry Chang, Kumar Bhaskaran, "Model-Driven Business Performance Management," icebe, pp. 295-304, IEEE International Conference on e-Business Engineering (ICEBE'05), Oct. 18-21, 2005, Beijing, China.*

Oracle Application Integration Architecture for Communications 2.0: Release Note; Nov. 2007; 37 pages.

* cited by examiner

REUSABLE BUSINESS SUB-PROCESSES AND RUN-TIME ASSEMBLY

CROSS REFERENCES TO RELATED APPLICATIONS

This invention claims priority from U.S. Provisional Patent application Ser. No. 61/114,273 filed on Nov. 13, 2008 which is hereby incorporated by reference as if set forth in full in this application.

BACKGROUND

Particular embodiments generally relate to the orchestration of business processes.

Business processes are typically modeled by business architects/analysts. A business process may include a series of services that are invoked during the business process. Services may be considered the smallest unit that can be modeled in the business process.

Some business processes may include a large number of services or may re-use certain sets of services. Instead of individually specifying each service that is used in a model, sub-processes are useful to specify a series of services. For example, a user may choose to include a sub-process in a larger business process. However, in an orchestration language, such as business process execution language (BPEL), it is not possible to use a sub-process unless the sub-process is deployed. That is, an information technology (IT) designer would have to have deployed the sub-process as a stand-alone executable process for it to be used by another business process. This restricts the use of sub-processes and decreases flexibility.

Also, currently, it is only possible to create BPEL processes in a BPEL editor and invoke a deployed BPEL process. Because the IT designer and business architects/analysts have different skill sets (the business architects/analysts are familiar with the business process being modeled and the IT designer is familiar with the orchestration language but not the business process), the resulting BPEL process developed by the IT designer may not work as the business architects/analysts imagined. Accordingly, there may be a wide divide between the originally conceived business process model and the implemented model.

SUMMARY

Particular embodiments provide a method for orchestrating an order fulfillment business process that includes a sub-process. In one embodiment, abstraction of business processes from an underlying information technology (IT) infrastructure is provided. An orchestration process can be designed using sub-processes such that services of the sub-process are assembled at run-time into an executable process.

A service library including services that can be used in the order fulfillment business process is provided. The library includes one or more sub-processes where a sub-process may be an existing process or process fragment that can be included in another business process. For example, the sub-process may include a plurality of services. A definition of a business process including sub-processes is received from an interface. For example, a business user may model the business process using the interface. A sub-process may be selected from the library and included in the business process as a step.

The business process is defined in steps to be performed in the order fulfillment business process. Metadata for the definition is determined during run-time to assemble an executable process. An executable process is assembled at run-time where the services included in the sub-process are included as individual steps in the executable process. An additional number of services that were defined in the business process may also be included. Services for the executable process are then dynamically invoked where invoking a service facilitates performance of a service associated with the service module.

Accordingly, the orchestration of the business process may be created using the interface. The interface may be a web-based administration user interface in which the business processes are built using the service/sub-processes defined in the business process provided. The executable process is assembled at run-time into a single executable process. Thus, the sub-process may not need to be a deployed executable process. Rather, the code for the services in the sub-process is added to code for other services that were defined in the business process to create the executable process. This allows for re-usability of sub-processes and also no special treatment is required for the sub-process, such as error (fault) handling and defined partner links that are needed to call the sub-process from a parent process.

A further understanding of the nature and the advantages of particular embodiments disclosed herein may be realized by reference of the remaining portions of the specification and the attached drawings.

DETAILED DESCRIPTION OF EMBODIMENTS

Particular embodiments provide for creation, use, and re-use of sub-processes. A sub-process may be an existing process or process fragment that can run within another process. Business processes may be modeled by users, such as business analysts. In modeling the business process, it may be desirable to include sub-processes. Sub-processes may be re-usable among different business processes. That is, different business processes that share common subsets of services may use a sub-process. For example, a sub-process may include a plurality of services that are performed. Instead of modeling the business process with each of the services as individual steps, a sub-process may be selected and included as a step in the business process.

Figure 1:
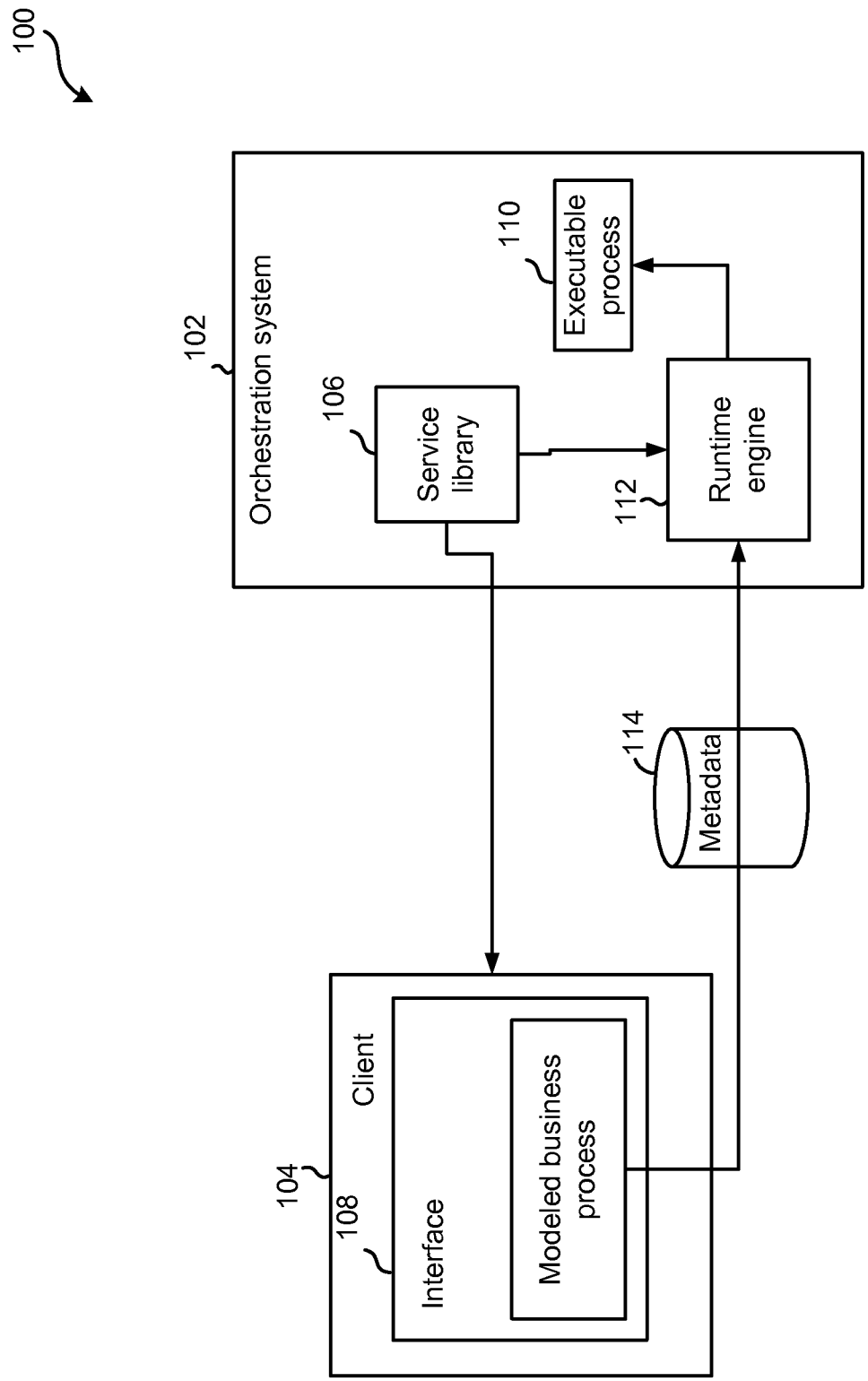
FIG. 1 depicts an example of a system for providing an orchestration process design and authoring environment according to one embodiment.
Figure 4:
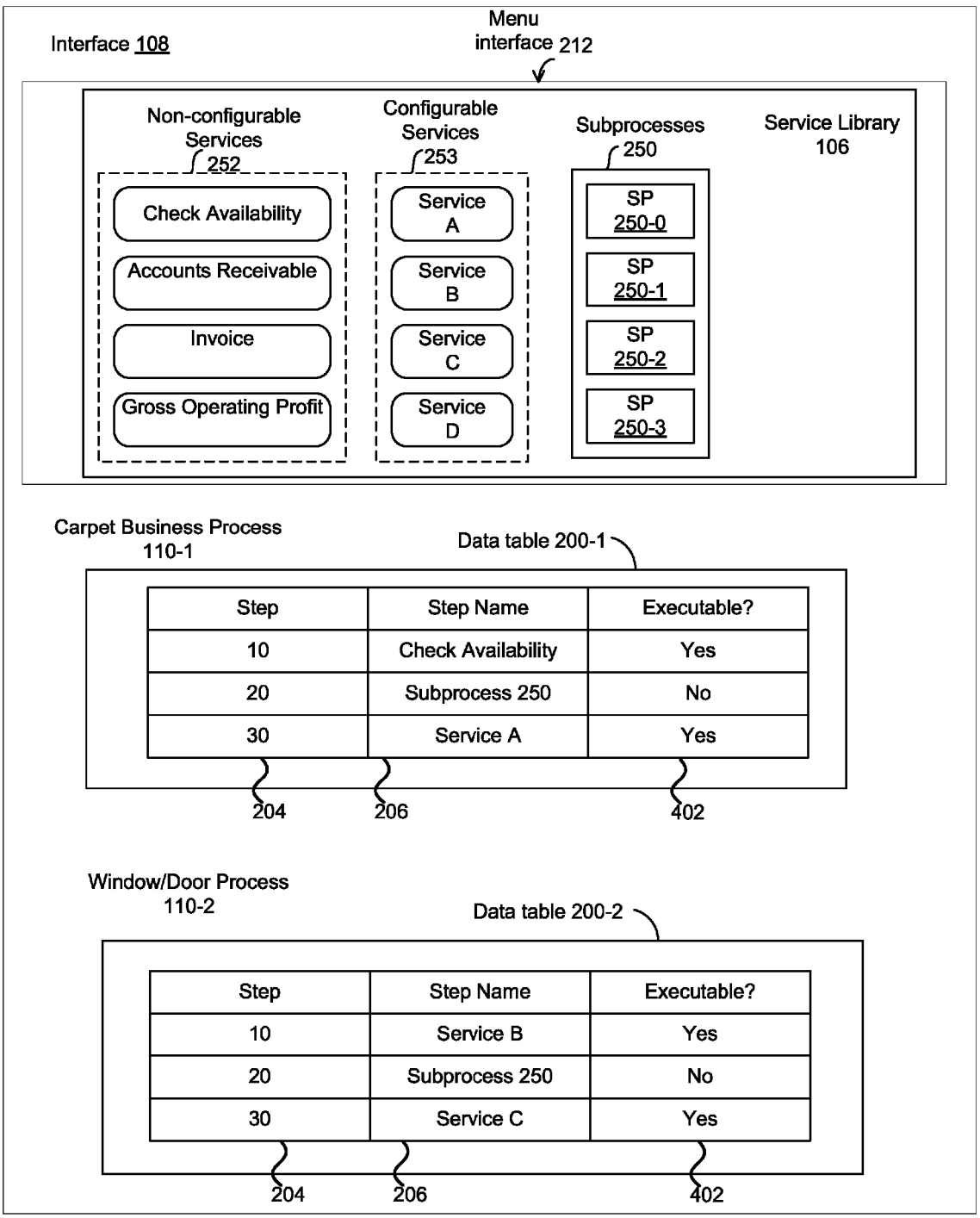
FIG. 4 shows an example of building executable processes using sub-processes according to one embodiment.
Figure 5:
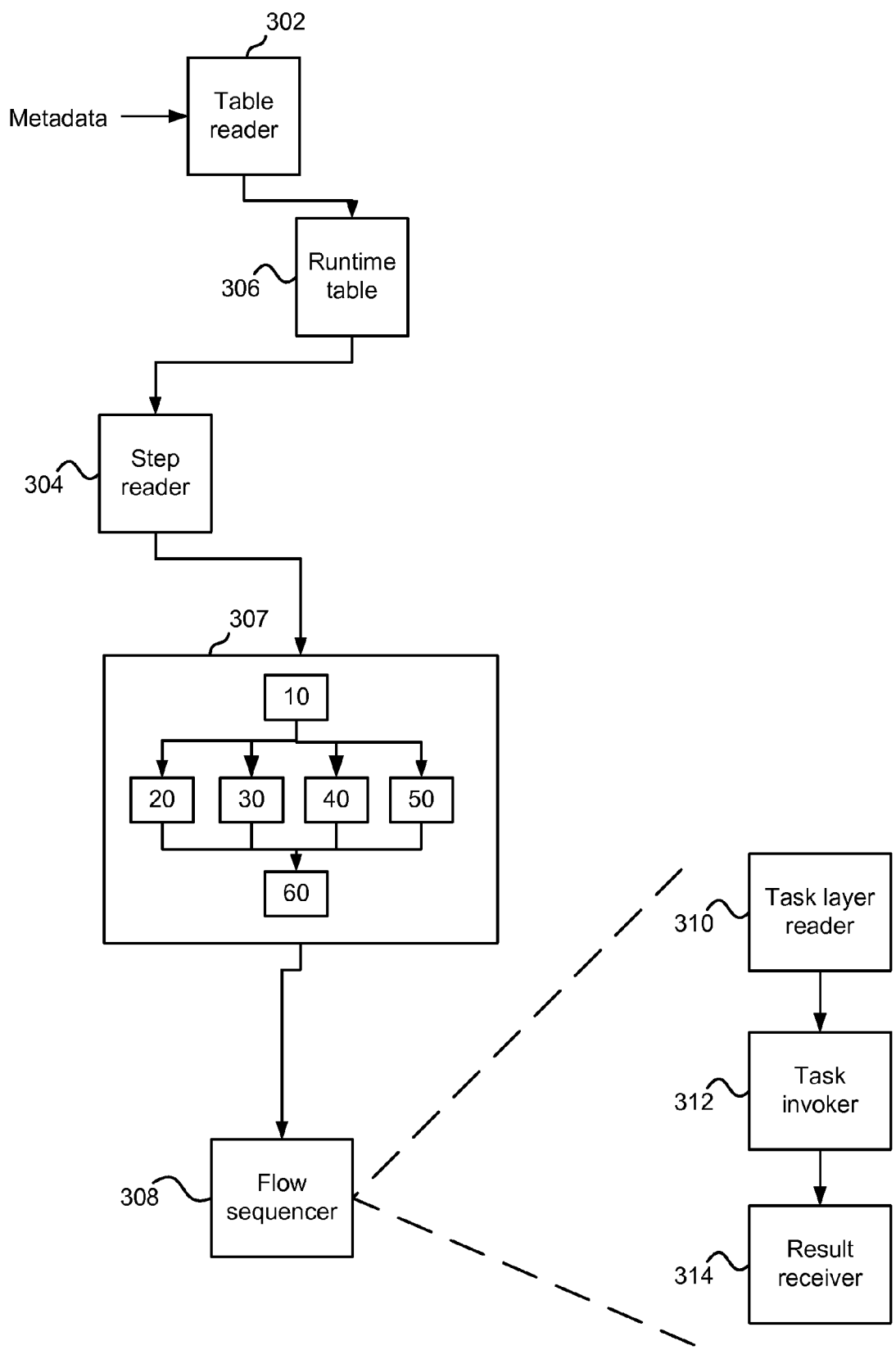
FIG. 5 describes the run-time operation according to one embodiment.

The following describes an overall system that may be used to generate and run an executable process in FIG. 1. Sub-processes will then be described in FIG. 2. An interface that may be used to abstract the authoring of business processes is described in FIG. 3. FIG. 4 describes use of the interface to specify sub-processes. FIG. 5 describes the run-time environment and FIG. 6 describes the run-time environment with respect to sub-processes.

System Overview

Particular embodiments provide a tool that provides a high degree of abstraction for orchestration business process design and authoring/modeling in an order fulfillment business process. Business processes may be modeled by users, such as business analysts, and do not need any coding from an IT designer to have the business process executed. Users are provided the flexibility to define executable business processes in a user interface, such as a web-based administration user interface. The executable business process may identify one or more services that define steps to be performed in the order fulfillment process. A run-time engine then uses the definition to dynamically invoke the services based on the definition of the executable business process.

In the business environment, business users are often process modelers, not IT personnel. By providing a web-based administration environment, the business users may be able to design the business process. The process definitions may be defined in business terms and not in IT terms. Particular embodiments allow an administrative environment outside of a code editor, such as a BPEL editor, for defining processes using associated services. Users can configure processes that can be executed at runtime as executable processes without IT involvement. This alleviates the need for deploying the processes every time a modification of the executable business process is needed. The user sets up the sequence of services on a data table. The modeled business process is then used to perform an executable process, which is assembled and executed at run-time. In one embodiment, 'run-time' can be defined as the time when an order is received for processing. Metadata is assembled in the data run-time table to and used to define the executable process for the business process. The metadata may be read into a runtime table and is used to invoke services in the executable process.

In one example, the services invoked are encapsulated and reusable. The metadata is used to determine how and when to invoke services. Also, depending on the metadata, input arguments are generated and sent to the services to invoke the service. A common signature is used to send data to invoke the services. Different input arguments can be formulated for different services used in different business executable processes. The input arguments are formatted in the same way such that a service can read the different sets of data and invoke the service. Thus, services can be re-used in different business processes without the need to be re-coded and redeployed. Deployment of services indicates the Services are deployed by setting a flag on the process definition that signals that the process is ready to be released for testing or production. An IT developer is not needed for deployment.

FIG. 1 depicts an example of a system 100 for providing an orchestration process design and authoring environment according to one embodiment. System 100 includes an orchestration system 102 and a client 104. Although single instances of orchestration system 102 and client 104 are provided, it will be understood that multiple instances may be used. Also, orchestration system 102 and client 104 may be part of a distributed computing system. That is, functions described may be distributed among various computing devices.

Orchestration system 102 may be a computing device or set of computing devices that are configured to allow a business process to be modeled. Orchestration system 102 also orchestrates the invocation and running of services in for an executable process 110 for the business process. Orchestration, as described, may be the coordination and invoking of services that need to be performed in the business process.

As used, a business process may be modeled by a user. The business process is a definition of steps to be performed. The steps are defined in interface 108. An executable process is the process that is executed by run-time engine 112. The executable process includes code that is executed to coordination performing of services.

A service library 106 that includes multiple services that can be included in an executable process 110 of a business process. In one embodiment, a service library 106 includes services that can be performed in an order fulfillment business process. Order fulfillment involves processes that are performed to fulfill an order. For example, an order may be received from an order capture system. The order may be for a good, service, etc. Different services may be performed to fulfill the order, such as shipment, installation, invoicing, etc. The order fulfillment process may be characterized in these different services. It is expected for any given order, some or all of these processes may need to be performed to fulfill the order. Accordingly, particular embodiments create services for the services that are expected to be performed in an order fulfillment process.

Services can be non-configurable units and configurable units. Non-configurable units are services that are built and provided to customers. The non-configurable units are units that likely may be used in an order fulfillment process. For example, it is expected that different steps services may have to be performed in the order fulfillment process, such as account receivable. Accordingly, these steps services may be modeled using a language, such as BPEL. Although BPEL is described, it will be understand that other languages may be used.

Configurable units are services that are built and defined by a customer. For example, a wrapper is provided around a service that is configured by a user. For example, a customer may want a shipping service that is specific to the customer's company. Accordingly, the service performed by the configurable unit may be defined and built by a customer, but the wrapper allows runtime engine 112 to invoke the service automatically. This allows customers to define services that are needed for their individual organizations.

The services may be re-used in different business processes. The services are encapsulated and configured to receive a common signature for the service to be performed. For example, for each business process, different parameters may be provided (i.e., different products may be ordered for different prices, etc.). This causes different input arguments to be inputted into the service. The common signature defines a data structure that allows the service to be re-used for different business executable processes 110. Thus, the same deployed service is used to process different input arguments for the different orders, but different results may be obtained. In this way, the order fulfillment process can be abstracted. Different users can define which services need to be performed without regard to how the processes are coded in an orchestration language.

Interface 108 may be an administration user interface. For example, a graphical user interface allows a user to model a business process at an abstract level. For example, service library 106 may be provided to client 104. The user may then use interface 108 to define steps of executable process 110 for the business process using services in service library 106. A user may define a plurality of steps in executable business process 110. Each step may be associated with a service in service library 106.

The steps may be stored in a data table, which may include metadata that may be used by runtime engine 112 to orchestrate executable process 110. The data table is shown as being stored in storage 114. It will be understood that the data table may be stored in any area, such as in client 104, orchestration system 102, or any other device. The metadata may be defined by the user, determined from data tables, and/or orchestration rules. The user defines the sequence in which the services are to be invoked as well as conditional or parallel branching that may be required to effect the business processing rules. When the user selects a service for a process step, the user also provides additional metadata that is used to determine how the processing data is to be displayed to users during the processing of an order at runtime. For example, conditional or parallel branching is defined.

At runtime, runtime engine 112 may receives the metadata for executable process 110. The metadata is then used to determine parameters for the orchestration of executable process 110. Runtime engine 112 uses the parameters to determine which steps to perform and when in executable process 110. For example, runtime engine 112 orchestrates executable process 110 by invoking services in the series of steps that have been defined by the user. As will be described in more detail below, parallel and conditional processing of steps can also be performed. Also, the metadata can be used to determine the input arguments used to invoke the services.

The metadata for the table is read at runtime and services are invoked, which allows changes to the executable process 110 to be performed and realized at runtime automatically. Runtime engine 112 reads through each step that is defined and performs the steps. If a change in service is desired, the user may use interface 108 to add/delete/replace a service. At run-time, when the table is read, the change may be automatically performed.

Sub-Processes

Figure 2:
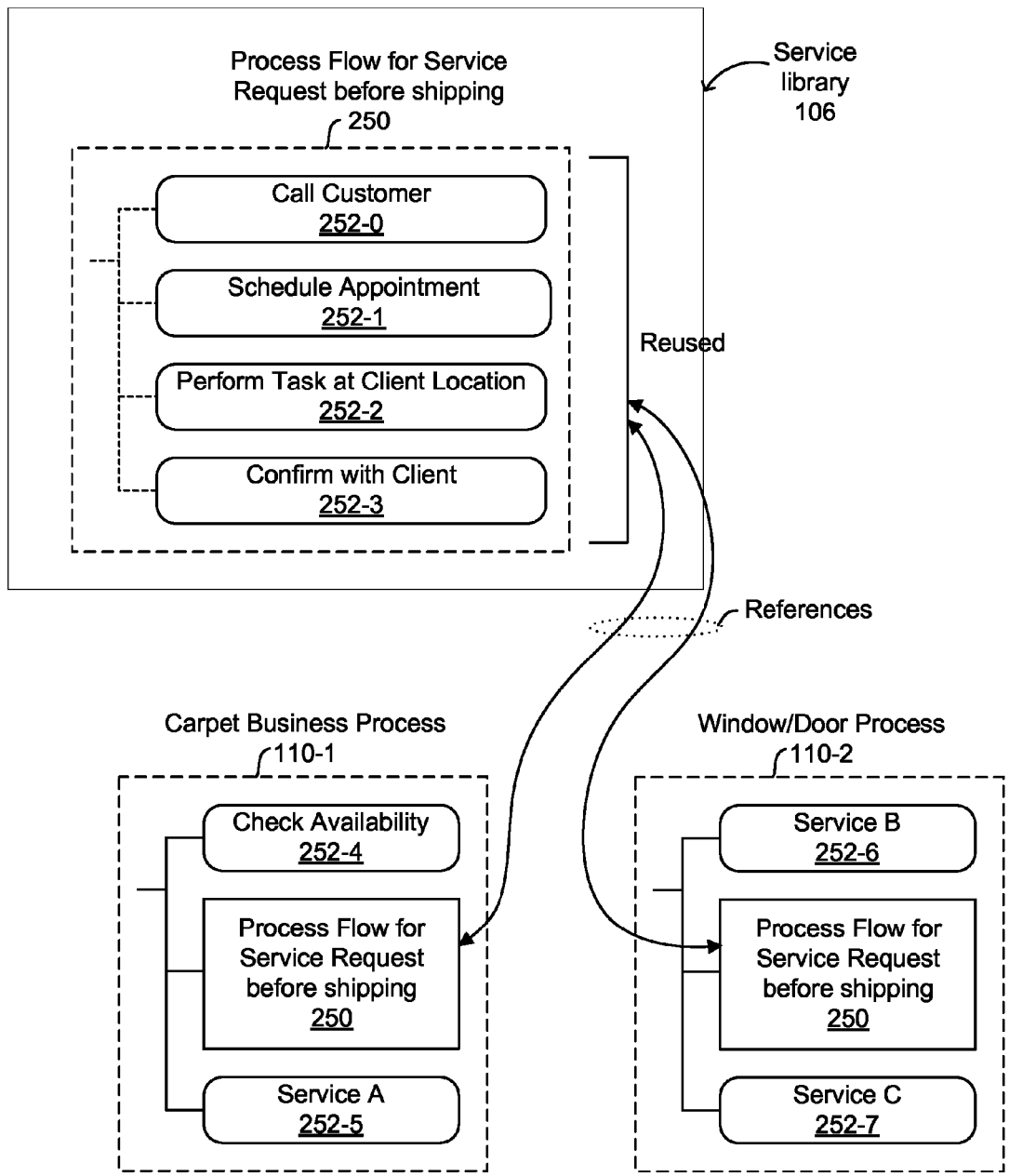
FIG. 2 shows the re-usability of sub-processes according to one embodiment.

FIG. 2 shows the re-usability of sub-processes according to one embodiment. A sub-process 250 is shown as a Process Flow for Service Request Before Shipping. A sub-process may be defined as an existing process or process fragment that can run within another process. For example, services 252 may be provided in sub-process 250. Services may be the smallest unit of work in a service library 106. For example, services may include Call Customer 252-0, Schedule Appointment 252-1, Perform Task at Customer Location 252-2, and Confirm with Client 252-3.

Sub-process 250 may include a series of services. Sub-process 250 may be thought of as a stand-alone business process or a fragment of a business process. Sub-process 250 allows users to re-use a series of services in different business processes. Each service in the sub-process may be individually found in service library 106. However, instead of having to individually specify that each service of sub-process 250 should be used for multiple steps in business processes, sub-process 250 may just be specified.

Sub-process 250 may be re-used in different business processes, such as a carpet business process 110-1 and a window/door business process 110-2. Business processes may include services 252 in addition to sub-processes 250. As shown, carpet business process 110-1 includes Check Availability service 252-4 and Service A 252-5, and window/door business process 110-2 includes Service B 252-6 and Service C 252-7. Also, each of the business processes uses the services included in sub-process 250.

Accordingly, sub-process 250 is re-used in different business process flows. Sub-processes 250 may or may not be executable themselves. For example, sub-processes 250 may not already be deployed executable sub-processes. In one embodiment, "executable" in a BPEL context or other context as contemplated by particular embodiments means that the sub-process is a complete, functional process that has been deployed. In particular embodiments, the sub-process may be a fragment, containing a set of invocations that would not be deployed or executable on their own. However, as will be described below, because an executable process 110 is assembled at run-time, sub-processes 250 do not need to be deployed or executable at run-time. The use of re-usable sub-processes allows users to define sub-processes and re-use them in several different business process flows.

Figure 3:
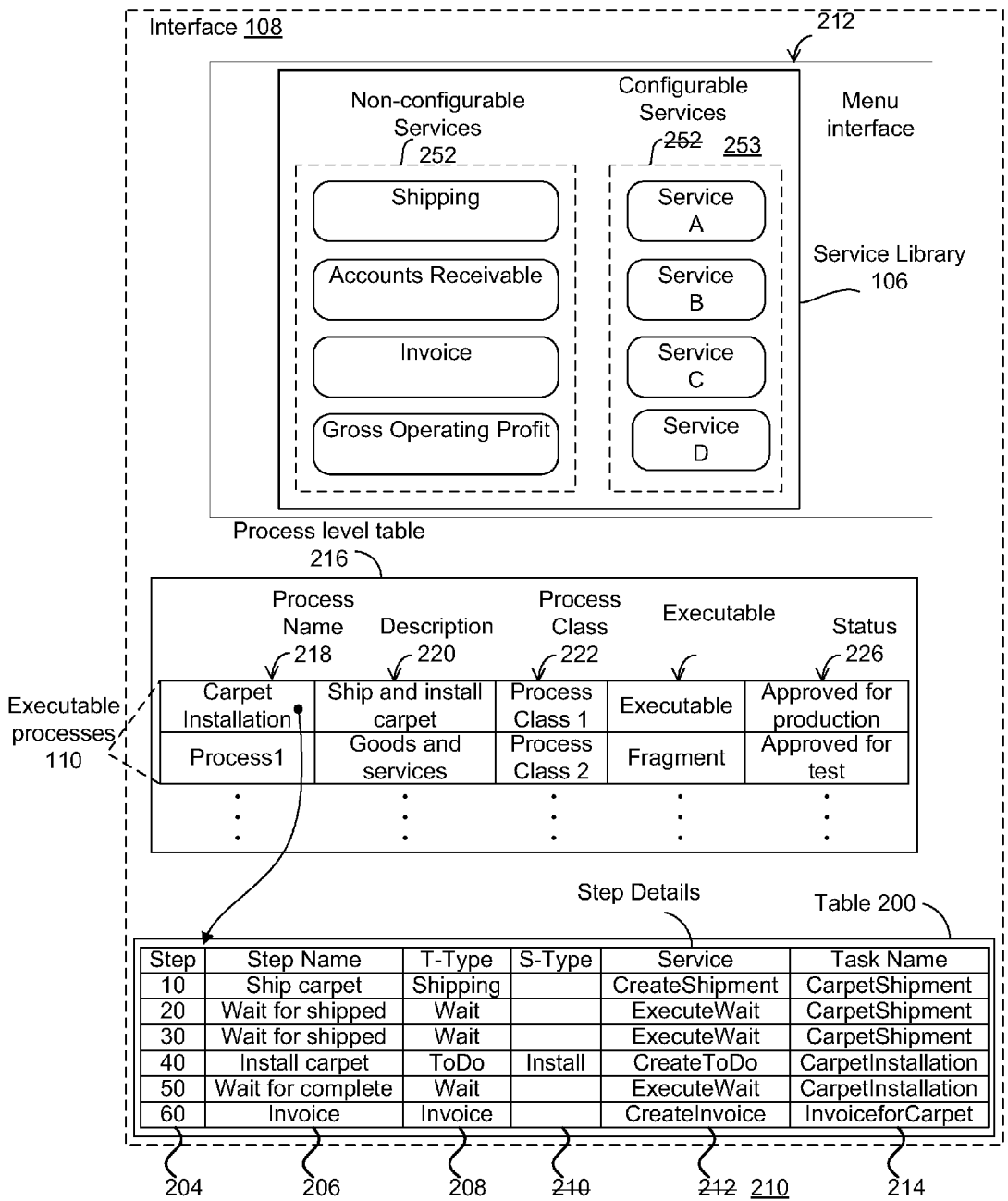
FIG. 3 depicts an example of an interface according to one embodiment.

The ability to define business processes is convenient for a user using a user interface as described in FIG. 3.

Interface

FIG. 3 depicts an example of an interface 108 according to one embodiment. Process level table 216 summarizes different business processes that have been modeled. As shown, the business processes—Carpet Installation and Process 1—have been modeled by a user.

In process level table 216, a process name column 218 shows a carpet installation business process and process 1 have been modeled. A description column 220 describes the process. A process class column 222 describes the class of the process. A status column 226 is the status of the executable process. There may be different statuses of executable processes 110. For example, some business processes may be approved for production, approved for test, or may be new. Production means that the service is approved for regular business use, approved for test is approved for testing, and new is a service in development.

A business process in table 216 can be selected and data table 200 may show the step details for individual business processes. One business process is entitled Carpet Installation and a data table 200 of step details shows each service that has been defined for the Carpet Installation.

In data table 200, a step column 204 identifies the steps in the business process. For example, steps 10-60 are provided. Services for these steps may be performed at runtime. The steps may be run in sequence from top to bottom (or in any other order). In this case, a step 10 is performed and when finished, a step 20 is performed, and so on. Additionally, although not shown, conditional and parallel steps may also be defined using interface 108. Conditional steps are steps that depend on a result occurring (e.g., another step finishing) and parallel steps are performed in parallel. A user defines whether steps should be conditional or parallel.

Step name column 206 provides a descriptive name for the steps. For example, ship carpet, wait for shipped, install carpet, wait for complete, and invoice steps are provided.

A task type column 208 describes what type of task is being performed. For example, for the ship carpet task, an external system may perform a shipping task and for the invoice step, an invoice system may invoice for a bill.

A service column 210 identifies the service associated with the step. A task name column 214 is the name of the task. For example, theses tasks have to do with carpet and are named carpet shipment, carpet installation, and invoice for carpet. It is possible that if something other than a carpet is being installed, the task name may be different. For example, a sink shipment, sink installation, and invoice for sink may be the names of these tasks.

Users may use interface 108 to generate data table 200. A user may select services from a menu for service library 106. For example, a user uses a menu interface 212 to select services from service library 106. Drop-down menus, drag-and-drop options, and other visual processes may be used to define executable process 110. Users are provided with an orchestration-specific interface that presents the business process data with suitable validations, rather than being required to learn the complexities of a multipurpose IT development environment. This allows a user to model a business process in an abstract manner, but have executable process 110 be generated and executed from the model.

The services in service library 106 may be made up of non-configurable units and configurable units. For example, non-configurable units are provided in a column 252 and configurable units are provided in a column 253. As shown, services that are non-configurable include shipping, accounts receivable (AR), invoice, and gross operating profit (GOP). Also, configurable units are designated as A, B, C, and D.

Table 200 is generated as shown in interface 108 using menu interface 212. Table 200 is associated with metadata that describes the services to be performed and any arguments that are needed to invoke the services.

Sub-Process Modeling Using Interface 108

FIG. 4 shows an example of defining business processes using sub-processes 250 in interface 108 according to one embodiment. As shown, service library 106 includes non-configurable units, configurable units, and sub-processes 250. Sub-processes 250 include a series of services (e.g., as shown in FIG. 2).

Instead of having a user individually define a series of steps associated with individual services, the user may select sub-processes 250 in interface 108. Sub-processes 250 may be included in menu interface 212. As shown, non-configurable services 252, configurable services 252, and sub-processes 250 are provided. Sub-processes 250 may be non-configurable sub-processes and/or configurable sub-processes.

A user may use interface 108 to define business processes. For example, carpet business process 110-1 and window/door business process 110-2 include the services and sub-process described in FIG. 2. However, a user is free to use any of the services and sub-processes included in service library 106.

Data tables 200-1 and 200-2 include the services that are included for different steps in carpet business process 110-1 and window/door business process 110-2 respectively. In one embodiment, when sub-process 250 is selected, it is included in data table 200 as a step. For example, a sub-process 250 may be defined in step 20 in data tables 200-1 and 200-2. Sub-process 250 may include the services Call Customer 252-0, Schedule Appointment 252-1, Perform Task at Customer Location 252-2, and Confirm with Client 252-3. However, instead of having the sub-process specify the four services in four different steps, the sub-process is defined for a step.

Carpet business process 110-1 is different from Window/Door business process 110-2 in that steps 10 and 30 are different (e.g., carpet business process 110-1 includes the steps check availability and service A and window/door process includes the steps of service B and service C). Sub-process 250 has been re-used in the two business processes though.

A column 402 indicates whether a service for a step is executable or not. In this case, sub-process 250 is not executable. This means that sub-process 250 cannot be deployed as a BPEL process. However, a deployable BPEL process could be specified for sub-process 250. In either case, the services of the sub-process are assembled at run-time as steps in a single executable process. The difference is that in one case, the sub-process is complete enough to represent a deployable process and in the other case, it is only a fragment and not deployable.

Run-Time Operation

Once the business process is defined in interface 108, run-time engine 112 is used to orchestrate the invocation of the services. FIG. 5 describes the run-time operation according to one embodiment. A table reader 302 receives metadata from interface 108 defining the business process. Table reader 302 may copy the data to a runtime table 306 but this is not necessary.

During run-time, a step reader 304 is configured to read the steps in runtime table 306. Step reader 304 may analyze the metadata and determine which steps should be executed and when. For example, step reader 304 checks to see if parallel or conditional branching is associated with a step. The metadata is also used to determine input arguments for the services. The input arguments may be determined from the metadata, from data in lookup tables, or determined using rules.

Step reader 304 may assemble executable process 110 using encapsulated services from service library 106 and the metadata, For example, code tor each service that was modeled in the steps is determined for executable process 110. The input arguments for each service are also determined. For example, the metadata is used to determine the input arguments such that the services can process an order for the business process. Also, any partner links are determined using the metadata to allow the services to interact with external systems. Executable process 110 is assembled based on the definition of steps in the business process. Because services are re-usable, the same code for a service can be used for different business processes. However, the input arguments or partner links may be different. Because the same code is re-used, automatic assembly of executable process 110 is provided.

Sub-processes are assembled into a single executable process 110 as shown in 307. Step 20 is assembled into steps 20-50 to represent the four services that were part of sub-process 250. Previous step 30 is now step 60 in executable process 110. As shown in 307, a step 10 may be performed and then steps 20, 30, 40, and 50 are performed in parallel. When these steps have been performed, a step 60 is performed.

Even though a sub-process was selected for a step, services may be treated as if individual services were selected for executable process 110. Thus, sub-processes may be included in a business process without being deployed executable processes and having associated partner links for the sub-process with a calling parent process. Conventionally, a sub-process would need to be deployed as an executable process. A parent process is then configured with partner links that are used to call the sub-process and to manage the variables used in the sub-process. This requires an IT designer to code and configure the parent process and sub-process to work together. If the sub-process was a deployed sub-process that is called by a parent process using, for example, receive/reply calls, then associated partner links need to be prepared. That is, the parent process needs to be coded with a method for calling the sub-process. Partner links need to be defined to pass variables to the sub-process and also special error (fault) handling needs to be coded into the executable process.

Particular embodiments assemble the services of the business process into a single executable process that is a series of steps of services at run-time and partner links do not need to be assembled to call the sub-process. Rather, executable process 110 runs as if it is a single executable process in which the services of the sub-process were defined as a series of steps. The sub-process itself is not invoked, rather the services assigned to the steps of the sub-process are invoked in the correct sequence as individual steps in executable process 110. Partner links are already available for the individual services assembled into the sub-process. Also, special treatment is not required for error (fault) handling in compensation or for the management of data variables within the sub-process because it does not have a separate invocation. The executable process generated at run-time is as if the user had individually defined the services in the business process.

A flow sequencer 308 is used to dynamically invoke the steps at the appropriate time based on executable process 110. As shown, a step 10 may be performed and then steps 20, 30, 40, and 50 are performed in parallel. When these steps have been performed, a step 60 is performed. Flow sequencer 308 may determine relevant input arguments depending on the content of the metadata received. These input arguments are then used to invoke a service. For example, flow sequencer 308 may include a task layer reader 310 that determines a service to invoke. A task invoker 312 then dynamically invokes the service. Any input arguments are used to invoke the service. In invoking the service, code for the encapsulated service is executed to coordinate performing of the service. For example, the executed code may prepare and send a message to an external system to perform the service.

The service may then be performed and the result is received at result receiver 314. In one example, if the task is shipping, then a shipping service generates a message for a shipping system regarding the shipping of a good. Once the shipping system ships the good, a message is returned to the shipping service, which stores the result.

After receiving a result, it is then checked whether further sequences need to be performed. For example, a while activity module checks to see whether further services need to be processed. For example, the process may be returned to flow sequencer 308 to allow for dynamic invocation of other steps in the process. Also, the while activity module may wait until parallel branches are completed.

Accordingly, the information required to invoke the services is determined automatically based on the runtime table. In one example, in BPEL, necessary partner links for all invocations have been created and are used to invoke the services. The services represented in the BPEL partner links are deployed BPEL processes that require no further configuration in order to be used in multiple business process definitions. When a service is invoked by the runtime engine, the corresponding partner link is accessed in the underlying BPEL process. Assembly of a service and modification of any service take place through the use of the metadata found in the runtime table and may be managed through interface 108.

Accordingly, a user can set up the steps in a business process. Executable process 110 can be automatically assembled at run-time. The code used in executable process 110 is not generated by the user who set up the business process. Rather, metadata can be defined and is used to assemble encapsulated services for executable process 110.

Figure 6:
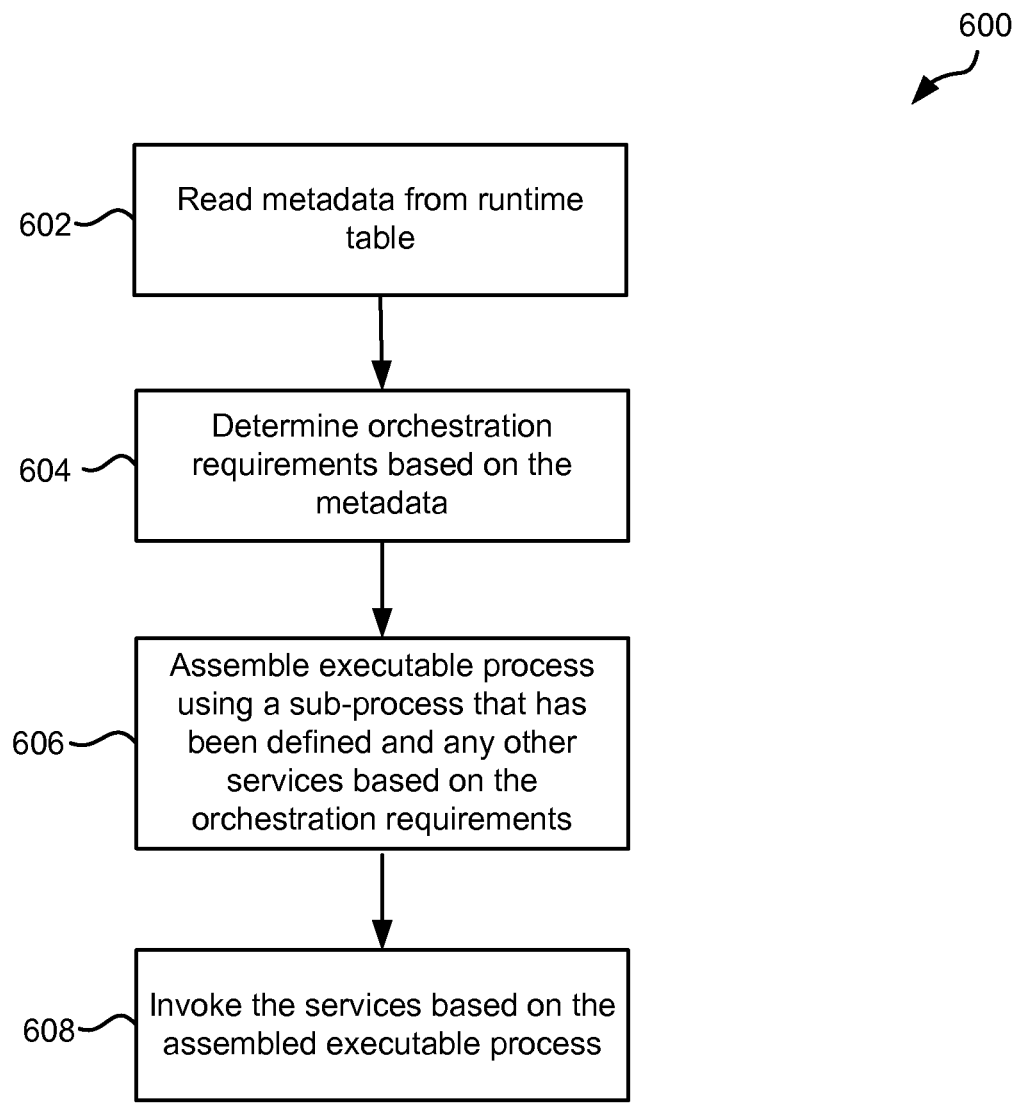
FIG. 6 depicts a simplified flowchart of a method for performing an executable process at run-time using sub-processes according to one embodiment.

FIG. 6 depicts a simplified flowchart 600 of a method for running an executable process at run-time using sub-processes according to one embodiment. Step 602 reads metadata from run-time table 306. Step 604 determines orchestration requirements based on the metadata. For example, the sequence and processing requirements may be determined. The sequence may be a sequence in which steps should be performed for services defined. Also, processing requirements, such as parallel, branching, and other requirements are determined.

Step 606 assembles executable process 110 using a sub-process that has been defined and any other services based on the orchestration requirements. For example, the metadata may define a series of steps. Some of the steps may have been defined using a sub-process. The services that are included in the sub-process are assembled into executable process 110 as if the individual services of sub-processes 250 were defined. This provides a single executable process 110.

Step 608 then invokes the services based on the assembled executable process 110. For example, the invocation is based on the orchestration requirements determined.

Particular embodiments provide sub-processes that may be re-used among different business processes. This functionality is not available in the BPEL specification. In a business environment, the sub-process re-usability and modularity is needed. Because business users are often process modelers, and not IT personnel, sub-processes reduce the burden on administration by allowing users to define multiple services in one sub-process. Particular embodiments allow sub-processes to be defined in an administrative environment outside of an orchestration language editor, such as a BPEL editor. Metadata is used to define what sub-processes should be used to assemble an executable process. Because of the high level of abstraction provided by interface 108, business process models may be synchronized with what a business analyst has envisioned. Also, by assembling sub-processes into an executable process at run-time, deployment and other requirements such as partner links and what variables are needed are not necessary.

Re-usability of sub-processes increases flexibility and reduces administrative costs. Self-assembly allows a running process to respond to change, such as the changing of the business process model or the receipt of additional information from external systems. Accordingly, sub-processes do not need to be re-deployed every time a modification to a sub-process is performed. Rather, the services that have been changed in a sub-process will be assembled at run-time.

Further description of a distributed order orchestration system is described in U.S. patent application Ser. No. 12/617,698, entitled "DISTRIBUTED ORDER ORCHESTRATION", filed concurrently and incorporated by reference for all purposes. Also, further details on orchestration are described U.S. patent application Ser. No. 12/617,695, entitled "DATA DRIVEN ORCHESTRATION OF BUSINESS PROCESSES" and U.S. patent application Ser. No. 12/617,697, entitled "VERSIONING AND EFFECTIVITY DATES FOR ORCHESTRATION BUSINESS PROCESS DESIGN", all of which are filed concurrently with this application and all of which are incorporated by reference for all purposes.

Although the description has been described with respect to particular embodiments thereof, these particular embodiments are merely illustrative, and not restrictive. Although BPEL is discussed, it will be understood that other languages may be used.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for processing, using a computer having one or more processors, an interface and a non-transitory computer readable storage medium in data communication with the one or more processors, one or more sub-processes in one or more business processes, the method comprising:
receiving, using the computer, user input from a menu in the interface to select one or more services and one or more sub-processes for inclusion as metadata in a first data table defining steps of a first business process, where a service is encapsulated, executable and configured to receive data in a common format for ease of reuse and where a sub-process includes a plurality of services;
assembling, using the computer, a first executable process at run-time based on the sequence of steps read from the metadata included in the first data table, where a step comprising a sub-process is assembled into a single executable process as if the plurality of services included in the sub-process were selected as individual steps so that the sub-process is assembled at runtime;
deploying, using the computer, the first executable process at runtime;
adding, using the computer, the plurality of services to a run-time table in the non-transitory computer readable storage medium;
determining, using the computer, orchestration requirements for the plurality of services; and
invoking, using the computer, the plurality of services based on the orchestration requirements.

2. The method of claim 1 wherein the sub-process is reusable in a second business process.

3. The method of claim 1 further comprising:
invoking at runtime, using the computer, the services assigned to steps of the subprocess an assembled executable process.

4. The method of claim 1 wherein the executable process invokes, using the computer, the plurality of services as individual steps and does not use partner links to call the sub-process.

5. The method of claim 1 wherein the executable process invokes, using the computer, the plurality of services of the sub-process as individual steps and does not require the setup of error handling specific to the sub-process in order to call the sub-process.

6. The method of claim 1 wherein the sub-process is a process fragment that is not deployed as an executable process.

7. The method of claim 1 wherein the executable process is assembled in a business process execution language (BPEL).

8. A non-transitory computer-readable storage medium comprising encoded logic for execution by one or more processors in data communication with the non-transitory computer readable storage medium, and the encoded logic when executed configured to process one or more sub-processes in one or more business processes, the logic configured to:
receive user input from a menu in an interface to select one or more services and one or more sub-processes for inclusion as metadata in a first data table defining steps of a first business process, where a service is encapsulated, executable and configured to receive data in a common format for ease of reuse and where a sub-process includes a plurality of services;
assemble a first executable process at run-time based on the sequence of steps read from the metadata included in the first data table, where a step comprising a sub-process is assembled into a single executable process as if the plurality of services included in the sub-process were selected as individual steps so that the sub-process is assembled at runtime;
deploy the first executable process at runtime;
add the plurality of services to a run-time table in the non-transitory computer readable storage medium;
determine orchestration requirements for the plurality of services; and
invoke the plurality of services based on the orchestration requirements.

9. The non-transitory computer-readable storage medium of claim 8 wherein the sub-process is reusable in a second business process.

10. The non-transitory computer-readable storage medium of claim 8 wherein the encoded logic is further configured to:
invoke at runtime the services assigned to steps of the sub-process an assembled executable process.

11. The non-transitory computer-readable storage medium of claim 8 wherein the executable process invokes the plurality of services as individual steps and does not use partner links to call the sub-process.

12. The non-transitory computer-readable storage medium of claim 8 wherein the executable process invokes the plurality of services of the subprocess as individual steps and does not require the setup of error handling specific to the subprocess in order to call the sub-process.

13. The non-transitory computer-readable storage medium of claim 8 wherein the sub-process is a process fragment that is not deployed as an executable process.

14. The non-transitory computer-readable storage medium of claim 8 wherein the executable process is assembled in a business process execution language (BPEL).

15. An apparatus configured to process one or more sub-processes in one or more business processes, the apparatus comprising:
- one or more processors;
- an interface; and
- logic encoded in one or more non-transitory tangible media for execution by the one or more processors, and when executed configured to:
- receive user input from a menu in the interface to select one or more services and one or more sub-processes for inclusion as metadata in a first data table defining steps of a first business process, where a service is encapsulated, executable and configured to receive data in a common format for ease of reuse and where a sub-process includes a plurality of services;
- assemble a first executable process at run-time based on the sequence of steps read from the metadata included in the first data table, where a step comprising a sub-process is assembled into a single executable process as if the plurality of services included in the sub-process were selected as individual steps so that the sub-process is assembled at runtime;
- deploy the first executable process at runtime;
- add the plurality of services to a run-time table in the non-transitory computer readable storage medium;
- determine orchestration requirements for the plurality of services; and
- invoke the plurality of services based on the orchestration requirements.

16. The apparatus of claim 15 wherein the sub-process is reusable in a second business process.

* * * * *

UNITED STATES PATENT AND TRADEMARK OFFICE
CERTIFICATE OF CORRECTION

| | | |
|---|---|---|
| PATENT NO. | : 8,627,271 B2 | Page 1 of 1 |
| APPLICATION NO. | : 12/617696 | |
| DATED | : January 7, 2014 | |
| INVENTOR(S) | : Reed et al. | |

It is certified that error appears in the above-identified patent and that said Letters Patent is hereby corrected as shown below:

In the Specification

In column 6, line 53, delete "theses" and insert -- these --, therefor.

In column 8, line 14, delete "metadata," and insert -- metadata. --, therefor.

In column 8, line 14, delete "tor" and insert -- for --, therefor.

In the Claims

In column 12, line 3, in Claim 3, delete "subprocess" and insert -- sub-process --, therefor.

In column 12, line 59, in Claim 12, delete "subprocess" and insert -- sub-process --, therefor.

In column 12, lines 60-61, in Claim 12, delete "subprocess" and insert -- sub-process --, therefor.

Signed and Sealed this
Eighth Day of July, 2014

Michelle K. Lee
*Deputy Director of the United States Patent and Trademark Office*